United States Patent [19]

Garnier et al.

[11] Patent Number: 5,272,238

[45] Date of Patent: Dec. 21, 1993

[54] PREPARATION PROCESS OF POLYMER, AND ORGANO-FERROMAGNETIC MATERIAL

[75] Inventors: Francis Garnier; Abderrahim Yassar, both of Thiais, France

[73] Assignee: Nippon Oil Co., Ltd., Tokyo, Japan

[21] Appl. No.: 775,317

[22] Filed: Oct. 15, 1991

[30] Foreign Application Priority Data

Oct. 19, 1990 [JP] Japan ............................... 2-279477

[51] Int. Cl.$^5$ ............................................. C08G 79/00
[52] U.S. Cl. ........................................ 528/9; 528/397; 525/360; 525/377; 525/383
[58] Field of Search ................... 528/9, 397; 525/360, 525/377, 383

[56] References Cited

U.S. PATENT DOCUMENTS

| | | | |
|---|---|---|---|
| 3,819,583 | 6/1974 | Kato ......................................... | 528/9 |
| 4,611,032 | 9/1986 | Kossmehl et al. ..................... | 528/9 |
| 4,873,304 | 10/1989 | Rosenblum ............................. | 528/9 |

FOREIGN PATENT DOCUMENTS 3703771 8/1988 Fed. Rep. of Germany .

OTHER PUBLICATIONS

Miller, J. S. and Epstein, A. J., J. Am. Chem. Soc., 1987, 109, 3850–3855.
Orchinnikov et al., Nature, 326, 370 (1987).
Joel S. Miller, et al., Prescription for Stabilization of Ferromagnetic Exchange in Molecular Solids via Admixing the Ground State with a Virtual Charge-Transfer Excited State, J. Am. Chem. Soc. 1987, 109, pp. 3850–3855.

Primary Examiner—John Kight, III
Assistant Examiner—Richard Lee Jones
Attorney, Agent, or Firm—Oblon, Spivak, McClelland, Maier & Neustadt

[57] ABSTRACT

The present invention provides a preparation process of a polymer which is characterized by reacting a specified metallocene which metal is a transition element of the group IV to group VIII in the periodic table, with an organic alkali metal compound and successively reacting with the compound represented by the formula $Y—(R^{11})_m—X$ wherein $R^{11}$ is a vinylene, phenylene, thienylene, and the like, X and Y are a hydrogen atom or halogen atom, and m is an integer of one or more, to obtain the polymer represented by the following formula:

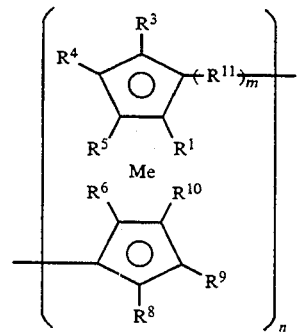

wherein n is an integer of 2 or more; further provides an organo-ferromagnetic material obtained by oxidizing said polymer, and a novel conjugated polymer containing ferrocene units.

3 Claims, No Drawings

PREPARATION PROCESS OF POLYMER, AND ORGANO-FERROMAGNETIC MATERIAL

BACKGROUND OF THE INVENTION

1. Field of the Invention

The present invention relates to a preparation process of a novel conjugated polymer containing metallocene units, organo-ferromagnetic material obtained by oxidizing said polymer, and a novel conjugated polymer containing ferrocene units.

2. Description of the Prior Art

Recently, accompanied by the progress of a highly information-intensive society, various magnetic materials such as magnetic discs, magnetic tapes and magnetic rubber have been developed and widely used. Organic high polymers are used in any of these magnetic material. Inorganic magnetic materials, however, are sometimes mixed in, applied to, or spattered on the organic high polymers. The organic high polymers are hence passively used merely as a matrix carrier. When organic high molecules having ferromagnetic properties can be obtained, material design can be carried out in the level of a molecule, extremely light materials can be obtained, and the influence will hence be very remarkable. In these circumstances, researches intending the development of high-molecular organo-ferromagnetic materials have become very active.

A. A. Ovchinnikov et al have prepared poly[1,4(2,2,6,6-tetramethyl-4-hydroxy-piperidinyl-1-oxyl)butadiin] by heat treating an acetylene compound having a 2,2,6,6-tetramethyl-4-hydroxypiperidinyloxy group which is a stable radical and proved that the polymer obtained has a weak magnetic property [A. A. Ovchinnikov et al, Nature, 326, 370(1987)].

The polymer, however, generates spin in a remote position from a conjugated primary chain and hence cannot sufficiently provide magnetic properties.

J. Miller et al have prepared a charge transfer complex from ferrocene and tetracyanoethylene and proved that the complex becomes a ferromagnetic material at 4.8 K [J. Miller et al, J.A.C.S. 109, 3850(1987)].

The above complex, however, is a monomer and cannot be expected characteristics of polymer. Further, it has been a problem that the temperature to exhibit ferromagnetic properties is too low in practical use.

SUMMARY OF THE INVENTION

As a result of intensive investigation in order to solve these problems, the present inventors have found a preparation process of a novel conjugated polymer containing metallocene units and also found that an organo-ferromagnetic material having excellent properties can be obtained by oxidizing the polymer obtained. Thus the present invention has been completed.

That is, the present invention has following aspects.

(1) A preparation process of a polymer which is characterized by reacting a compound represented by the formula (I):

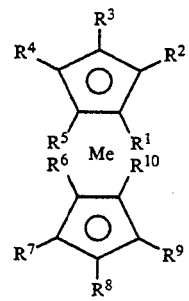

wherein $R^1$, $R^2$, $R^3$, $R^4$, $R^5$, $R^6$, $R^7$, $R^8$, $R^9$ and $R^{10}$ are a hydrogen atom, halogen atom, hydrocarbon having from 1 to 10 carbon atoms, amino, cyano, nitro, carboxyl or hydroxyl, $R^1$, $R^2$, $R^3$, $R^4$, $R^5$, $R^6$, $R^7$, $R^8$, $R^9$ and $R^{10}$ may be the same or different, and Me is a transition element of the group IV to group VIII in the periodic table, with an organic alkali metal compound and successively reacting with the compound represented by the formula (II):

$$Y-(R^{11})_m-X \quad (II)$$

wherein $R^{11}$ is a vinylene, phenylene, thienylene, pyrrolylene, furylene, selenophenylene, telluruphenylene, anililene, quinolylene and conjugately combined group thereof, X and Y are a hydrogen atom or halogen atom, and m is an integer of one or more, to obtain the polymer represented by the formula (III):

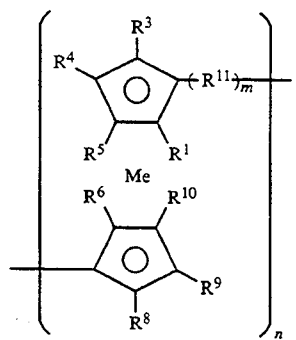

wherein $R^1$, $R^3$, $R^4$, $R^5$, $R^6$, $R^8$, $R^9$, $R^{10}$, $R^{11}$, Me and m are the same as above formula (I) and (II) and n is an integer of 2 or more.

(2) An organo-ferromagnetic material obtained by oxidizing a polymer represented by the formula (III):

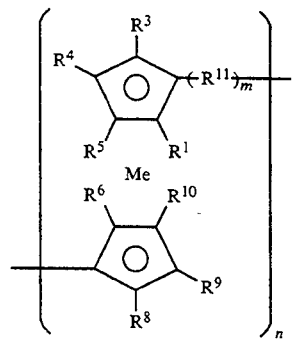

wherein $R^1$, $R^3$, $R^4$, $R^5$, $R^6$, $R^8$, $R^9$ and $R^{10}$ are a hydrogen atom, halogen atom, hydrocarbon having from 1 to 10 carbon atoms, amino, cyano, nitro, carboxyl or hydroxyl, $R^1$, $R^3$, $R^4$, $R^5$, $R^6$, $R^8$, $R^9$ and $R^{10}$ may be the same or different, $R^{11}$ is a vinylene, phenylene, thienylene, pyrrolylene, furylene, selenophenylene, telluruphenylene, anililene, quinolylene and a conjugately combined group thereof, Me is a transition element of the group IV to group VIII in the periodic table, m is an integer of 1 or more, and n is an integer of 2 or more.

(3) A polymer represented by the formula (IV):

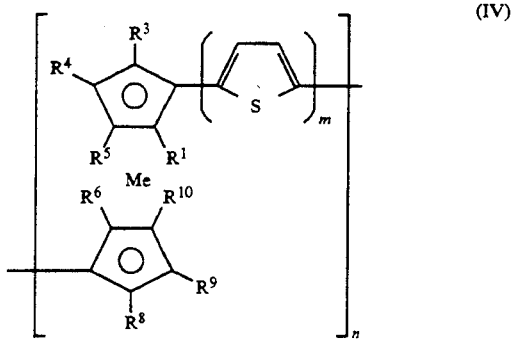

(IV)

wherein $R^1$, $R^3$, $R^4$, $R^5$, $R^6$, $R^8$, $R^9$ and $R^{10}$ are a hydrogen atom, halogen atom, hydrocarbon having from 1 to 10 carbon atoms, amino, cyano, nitro, carboxyl or hydroxyl, $R^1$, $R^3$, $R^4$, $R^5$, $R^6$, $R^8$, $R^9$ and $R^{10}$ may be the same or different, m is an integer of 1 or more and n is an integer of 2 or more.

DETAILED DESCRIPTION OF THE INVENTION

The present invention will be illustrated in detail hereinafter.

In the compound of the formula (I) for use in the invention, from $R^1$ to $R^{10}$ are a hydrogen atom, halogen atom, hydrocarbon having from 1 to 10 carbon atoms, amino, cyano, nitro, carboxyl or hydroxyl; $R^1$, $R^2$, $R^3$, $R^4$, $R^5$, $R^6$, $R^7$, $R^8$, $R^9$ and $R^{10}$ may be the same or different; and said hydrocarbon group includes alkyl such as methyl, ethyl, propyl, isopropyl and butyl; aryl such as phenyl, tolyl, xylyl, cumenyl and mesityl; aralkyl such as benzyl, phenethyl, styryl and benzhydryl; alkoxy such as methoxy, ethoxy, propoxy and buthoxy; aryloxy such as phenoxy; aralkyloxy such as benzyloxy; and aldehyde.

Exemplary compound which is used in the invention and represented by the formula (I) includes:

(Titanocene)
titanocene, 1,1',3,3'-bis(1,1'-dimethylethyl)titanocene, 1,1'-bis(1,1'-dimethylethyl)titanocene, 1,1',3,3'-bis(-methylethyl)titanocene, 1,1'-bis(1-methylethyl)titanocene, methyltitanocene, 1,1'-dimethyltitanocene and dibutyltitanocene;

(Zirconocene)
zirconocene, 1,1',3,3'-tetrakis(1,1'-dimethylethyl)zirconocene and dibutylzirconocene;

(Chromocene)
chromocene, phenylchromocene, 1,1',2,2',3,3',4,4'-octaphenylchromocene, 1,1',2,2',3,3',4,4'-octamethylchromocene, 1,1'-dibutylchromocene, 1,1'-bis(1,1'-dimethylethyl)chromocene, 1,1'-dimethyl-3,3'-diphenylchromocene, 1,1',3,3'-tetraphenylchromocene, 1,1'-diethylchromocene and 1,1'-dimethylchromocene;

(Nickelocene)
nickelocene, 1,1',2,2',3,3',4,4'-octaphenylnickelocene, 1,1'-dichloronickelocene, 1,1'-bis(phenylmethyl)nickelocene, ethylnickelocene, 1,1'-dipropylnickelocene, decabis(methoxycarbonyl)nickelocene, 1,1'-bis(methoxycarbonyl)nickelocene, 1,1'-diacetylnickelocene, 1,1'-dimethyl-3,3'-diphenylnickelocene and methoxynickelocene;

(Vanadocene)
vanadocene, 1,1'-diethylvanadocene, 1,1'-ethynylvanadocene, 1,1',2,2',3,3',4,4'-octaphenylvanadocene, 1,1'-bis(methoxycarbonyl)vanadocene, 1,1',2,2',3,3',4,4'-octamethylvanadocene, phenylethynylvanadocene, phenylmethylvanadocene, (1-phenylethyl)vanadocene, (1-methyl-1-phenylethyl)-vanadocene, decamethylvanadocene, phenylvanadocene and 1,1'-dibutylvanadocene, (Osmocene)
osmocene, 1-hydroxyethylosmocene, 2-hydroxyethylosmocene, 1,1'-bis(4-fluorophenyl)osmocene, aminocarbonylosmocene, 1,1'-dimethylosmocene and (2-cyano-1-hydroxy-1-phenylethyl)osmocene;

(Ruthenocene)
ruthenocene, acetylruthenocene, (2-amino-2-carboxyethyl)ruthenocene, benzoylruthenocene, (2-benzoyl-3-oxo-1-butenyl)ruthenocene, 1,1'-bis(acetyloxy)ruthenocene, 1,1':3,3'-bis(1,4-butanediyl)ruthenocene, 1,1'-bis(chlorocarbonyl)ruthenocene, 1,1'-bis(2-chloroethoxy)ruthenocene, 1,1'-bis(chloromethyl)ruthenocene, 1,3-bis[(dimethylamino)carbonyl]ruthenocene, 1,1'-bis(4-fluorophenyl)ruthenocene, 1,1':3,3'-bis(1,3-propanediyl)ruthenocene, bromoruthenocene, 1,1'-diacetylruthenocene, 1,1'-dibromoruthenocene, 1,1'-dimercaptoruthenocene, [(dimethylamino)carbonyl]ruthenocene, [(dimethylamino)methyl]ruthenocene, 1,1'-[(dimethylsilylene)bis(thio)]ruthenocene, 1,1'-[(diphenylmethylene)bis(thio)]-ruthenocene, 1-(ethoxycarbonyl)-2-formylruthenocene, formylruthenocene, (1-hydroxyethyl)ruthenocene, methylruthenocene, 1,1'-[methylenebis(thio)]-ruthenocene, (1-oxo-3-phenyl-2-propenyl)ruthenocene, 1,1'-[oxybis(1,2-ethanediyloxy)]ruthenocene, 1,1'-(1,3-propanediyl)ruthenocene, (trichlorosilyl)ruthenocene and 1,1'-trithioruthenocene;

(Cobaltocene)
cobaltocene, aminocobaltocene, (aminocarbonyl)cobaltocene, 1,1'-bis(diphenylphosphino)cobaltocene, 1,1'-bis(1-methylethoxy)cobaltocene, 1,1'-bis(1-methylethyl)cobaltocene, 1,1'-bis(1-methylpropyl)cobaltocene, carboxycobaltocene, 1,1'-dicarboxycobaltocene, 1,1'-diethylcobaltocene, 1,1'-dimethylcobaltocene and 1,1'-dinitrocobaltocene;

(Ferrocene)
ferrocene, acetylferrocene, (acetylamino)ferrocene, 1-acetyl-1'-benzoylferrocene, 1-acetyl-1'-bromoferrocene, 1-acetyl-2-(1,1'-dimethylethyl)ferrocene, 1-acetyl-3-ethylferrocene, (4-acetylphenyl)ferrocene, aminoferrocene, (1-aminoethyl)ferrocene, 1,1'-bis-(acetyloxy)ferrocene, 1,1'-bis(2-bromoethyl)ferrocene, 1,1'-bis(chlorocarbonyl)ferrocene, 1,1'-bis(2-chloroethoxy)ferrocene, 1,1'-bis[(dimethylamino)methyl]ferrocene, 1,1'-bis(diphenylphosphino)ferrocene, 1,1'-bis(1-hydroxyethyl)fmeerrocene, 1,1'-bis(-methylethyl)ferrocene, 1,1'-bis(methylthio)ferrocene, bromoferrocene, butylferrocene, carboxyferrocene, chloroferrocene, chloroacetylferrocene, (2- chlorobenzoyl)ferrocene, cyanoferrocene, 1,1'-diacetylferrocene, 1,1'-dibutylferrocene, 1,1'-dichloroferrocene, 1,1'-diethylferrocene, 1,1'-dimethylferrocene, [(dimethylamino)methyl]ferrocene, (1,3-dioxobutyl)ferrocene, (diphenylamino)ferrocene, (diphenylphosphino)ferrocene, ethenylferrocene, ethoxyferrocene, ethylferrocene, 1-ethyl-1'-hexylferrocene, (3-ethylphenyl)ferrocene, formylferrocene, (1-hydroxyethyl)ferrocene, iodoferrocene, mercaptoferrocene, methoxyferrocene, methylferrocene, (1-methylethoxy)ferrocene, (1-methylethyl)ferrocene, nitroferrocene, phenylferrocene, phenylaminoferrocene, (phenylmethyl)ferrocene, [1-(phenylthio)ethyl]ferrocene, propylferrocene, 1,1',2,2'-tetrachloroferrocene, 1,1',2,2'-tetramethylferrocene, 1,1',3,3'-tetramethylferrocene and trifluoromethylferrocene.

The organic alkali metal compound which is used for reacting with the compound of the formula (I) is represented by the formula:

R' Ma wherein Ma is an alkali metal element such as Li, Na and K, and R' is a hydrocarbon group having from 1 to 12 carbon atoms. The hydrocarbon group includes alkyl such as methyl, ethyl, propyl and butyl, aryl such as phenyl, tolyl and xylyl and aralkyl such as benzyl.

Exemplary organic alkali metal compound includes methyllithium, ethyllithium, butyllithium, phenyllithium, benzyllithium, methylpotassium and methylsodium. Butyllithium is preferred in particular.

The reaction of the compound of the formula (I) with the organic alkali metal compound is usually carried out in an organic solvent including aliphatic hydrocarbons such as pentane, hexane and heptane; aromatic hydrocarbons such as benzene, toluene and xylene; and ethers such as diethyl ether and tetrahydrofuran, and also carried out under inactive atmosphere such as argon and nitrogen. No particular restriction is imposed upon the reaction temperature so long as the reaction is conducted between solidifying point and boiling point of the solvent used. The reaction temperature is suitably selected depending upon the solvent used and is usually in the range of from 0° to 100° C., preferably from 50° to 80° C. The reaction time is usually in the range of from 10 minutes to 10 hours, preferably from 1 to 5 hours.

In the reaction, the proportions of the organic alkali metal compound to the compound of the formula (I) is in the range of usually from 0.01 to 100 moles, preferably from 0.05 to 10 moles, more preferably from 0.1 to 5 moles of the organic alkali metal compound per mole of the compound of the formula (I).

The reaction can also be carried out in the presence of amines such as tetramethylenediamine, N,N,N',N'-tetramethylethylenediamine, N,N,N',N'-tetraethylethylenediamine and triethylenediamine.

In the reaction, the alkali metal atom is introduced into the cyclopentadienyl group of the compound represented by the formula (I) as described below.

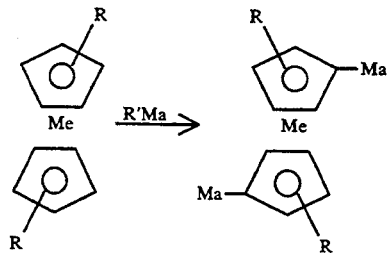

In the preparation process of the polymer of the invention, the reaction product thus obtained (hereinafter referred to as reactant ①) is reacted with the compound of the above formula (II) to give the desired polymer represented by the formula (III).

In the compound represented by the formula (II), $R^{11}$ is vinylene, phenylene, thienylene, pyrrolylene, furylene, selenophenylene, telluruphenylene, anilylene, quinolylene and a conjugated group obtained by combining a plurality of these groups, for example, phenylenevinylene, pyrrolylenevinylene or thienylenevinylene. X and Y are hydrogen atoms or halogen such as fluorine, bromine, chlorine and iodine. m is an integer of 1 or more, preferably from 1 to 1000, more preferably from 2 to 500.

Exemplary compound of the formula (II) which is suitable for use in the invention include:

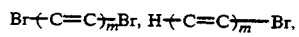

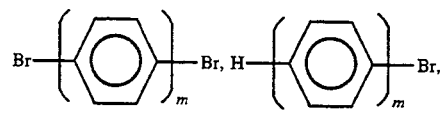

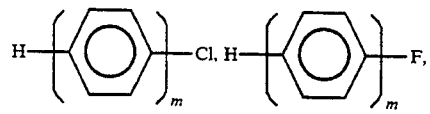

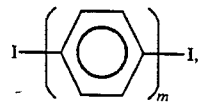

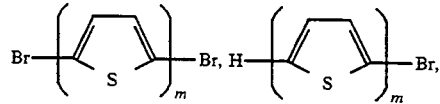

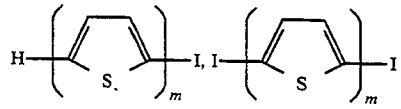

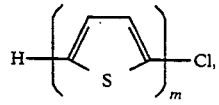

-continued

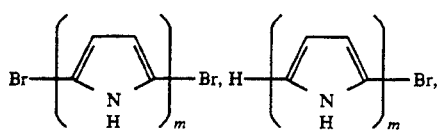

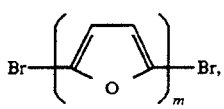

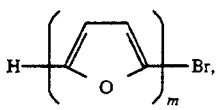

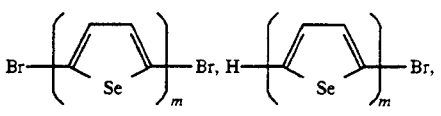

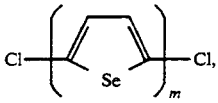

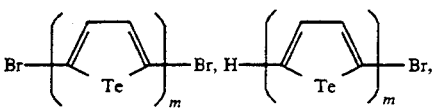

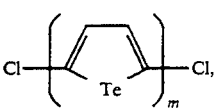

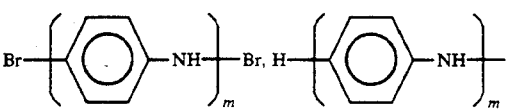

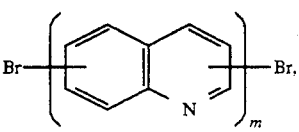

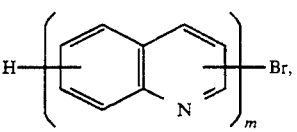

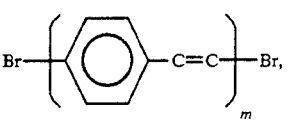

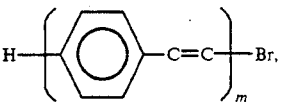

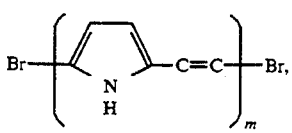

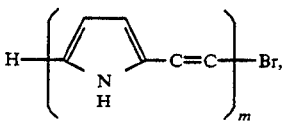

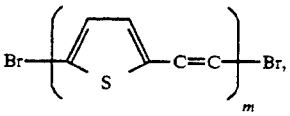

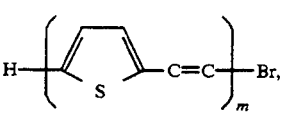

The reaction of reactant ① with the compound of the formula (II) is carried out by various methods such as a direct reaction method and a reaction method using the third compound. Suitable methods include, for example, a method for previously reacting reactant ① with zinc halide such as zinc chloride or zinc fluoride and subsequently reacting with the compound of the formula (II), and a method for repeating the previous and subsequent reactions.

The embodiments of the reactions are that reactant ① and zinc halide are reacted usually in an organic solvent such as the above-mentioned aliphatic hydrocarbon, aromatic hydrocarbon and ether and under an inert atmosphere such as argon and nitrogen. No particular limitation is placed on the reaction temperature so long as the reaction is carried out between the solidification point and boiling point of the solvent. The reaction temperature is suitably selected depending upon the solvent used and is usually in the range of from 0° to 100° C., preferably from 50° to 80° C. The reaction time is usually in the range of from 10 minutes to 10 hours, preferably from 1 to 5 hours.

The proportion of zinc halide in the reaction is from 0.01 to 100 moles, preferably from 0.1 to 10 moles, more preferably from 0.5 to 5 moles per mole of the reactant ①.

By these reactions, a zinc halide unit is introduced into the cyclopentadienyl group in the compound of the formula (I) as described below.

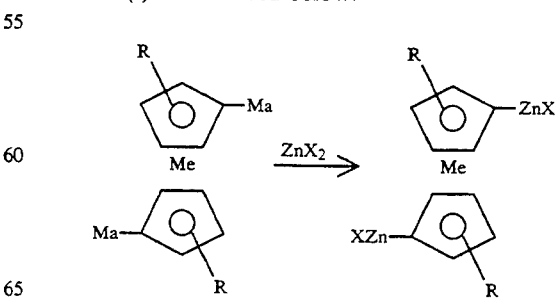

The reaction product ① reacts with zinc halide to give a reaction product (hereinafter referred to as reactant ②) as illustrated above. The reaction of reactant ② with the compound of the formula (II) is carried out usually in a solvent such as the abovementioned aliphatic hydrocarbon, aromatic hydrocarbon and ether, and under an inert atmosphere such as argon and nitrogen. No particular restriction is put on the reaction temperature so long as the reaction is carried out between the solidification point and boiling point of the solvent used. The temperature is suitably selected depending upon the solvent used and is usually in the range of from 0° to 100° C., preferably from 30° to 80° C. The reaction time is usually in the range of from 10 minutes to 100 hours, preferably from 1 to 80 hours.

The proportion the compound of the formula (II) in the reaction is in the range of from 0.01 to 100 moles, preferably from 0.1 to 10 moles, more preferably 0.5 to 5 moles per mole of reactant ②.

The above reaction may be carried out in the presence of a transition metal compound such as $Pd(PPh_3)_4$.

As mentioned above, the polymer represented by the formula (III) of the invention can be obtained by repeating such reaction as above. That is, the reaction product obtained by reaction of reactant ② with the compound of the formula (II) is further reacted with zinc halide under the same conditions as above and can be successively reacted again with the compound of the formula (II).

As an alternative method, reactant ② is reacted with the compound of the formula (II). The reaction product obtained can be reacted with the organic alkali metal compound and successively reacted with various coupling agents such as copper chloride and nickel chloride to obtain the polymer of the invention. The conditions for reacting the organic alkali metal compound is the same as in the preparation of reactant ①. The reaction of various coupling agents is usually conducted in the organic solvent such as the above-mentioned aliphatic hydrocarbon, aromatic hydrocarbon and ether and under inert atmosphere such as argon and nitrogen. No particular limitation is imposed on the reaction temperature so long as the reaction is conducted between the solidification point and melting point of the solvent used. The reaction temperature is suitably selected depending upon the solvent used and is usually in the range of from 0° to 100° C., preferably from 30° to 80° C. The reaction time is usually in the range of from 10 minutes to 100 hours, preferably from 1 to 80 hours. The amount of the coupling agent in the reaction is in the range of from 0.01 to 100 moles, preferably from 0.1 to 10 moles, more preferably from 0.5 to 5 moles per mole of the reaction product obtained by reacting the organic alkali metal compound with the reaction product of reactant ② and the compound of the formula (II).

Thus, the polymer of the present invention, that is, the polymer represented by the formula (III) can be obtained. The polymerization degree of the polymer, that is, the value of n is suitably controlled depending upon the reaction temperature, kind of the solvent used and reaction time, and is 2 or more, usually in the range of from 2 to 100000, preferably from 2 to 50000, most preferably from 3 to 10000.

The present invention has another characteristic which can provide a ferromagnetic material with ease by oxidizing the polymer represented by the formula (III).

In practice, oxidation can be readily carried out by doping an electron acceptor molecule into the polymer matrix. No particular restriction is placed on the method of doping. The method which can be carried out includes chemical method, electrochemical method which conducts electrolytic oxidation in a solvent containing electron acceptor anion and ion implantation method which accelerates the acceptor ion and drives it into the material.

No particular restriction is imposed on the electron acceptor molecule for use in the invention so long as giving no adverse effect on the object of the invention.

Exemplary electron acceptor molecule which can be used for chemical doping includes halogen compounds such as iodine, bromine and hydrogen iodide; metal halides such as arsenic pentafluoride, phosphorus pentafluoride, phsophorus pentachloride, antimony pentafluoride, silicon tetrafluoride, aluminum chloride, aluminum bromide, aluminum fluoride and ferric chloride; protic acids such as sulfuric acid, nitric acid and chlorosulfonic acid; oxidizing agents such as sulfur trioxide, difluorosulfonyl peroxide, nitronium tetrafluoroborate and nitronium hexafluorophosphate; and organic compounds such as tetracyanodimethane.

The electron acceptor anion which can dope electrochemically includes, for example, halogenide anions of Group Va elements such as $PF_6^-$, $SbF_6^-$ and $AsF_6^-$; halogenide anions of Group IIIa elements such as $BF_4^-$; halogen anions such as $I^-(I_8^-)$, $Br^-$ and $Cl^-$; and perchlorate anions such as $ClO_4^-$.

The electron acceptor ion which can dope by ion implantation method includes, for example, cations such as $Br^+$, $Cl^+$ and $I^+$.

Doping concentration is generally at least 0.001 mol, preferably at least 0.05 mole per recurring structural unit represented by the formula (III).

Consequently, the present invention readily provides organic ferromagnetic materials having excellent properties by oxidizing the polymer represented by the formula (III).

The polymer of the present invention can be prepared by simple production steps and has excellent characteristics such as linear structure of the polymer molecule obtained and a long conjugated polymer chain. The polymer obtained by oxidizing the metallocene containing conjugate polymer of the invention exhibits magnetic characteristics while maintaining properties of organic macromolecules, and hence can be applied to various uses such as memory materials. Magnetism of the material emerges on the level of molecule and hence memory materials having light weight and high memorial density can be prepared.

The present invention will hereinafter be illustrated by way of examples. However these examples are not to be construed to limit the scope of the invention.

EXAMPLE 1

Synthesis of 1,1'-bis(2-thienyl)ferrocene

Under argon atmosphere, 0.11 mole of n-butyllithium, 9.3 g (0.5 mol) of ferrocene, 16.5 ml (0.11 mol) of tetramethylenediamine catalyst and 70 ml of hexane solvent were mixed and reacted at 60° C. for 2 hours. The reaction mixture obtained was added dropwise at room temperature to 60 ml of an anhydrous tetrahydrofuran solution containing 13.6 g (0.1 mol) of zinc chloride and further stirred for 2 hours at room temperature.

The reaction mixture thus obtained was added dropwise to 40 ml of a tetrahydrofuran solution containing 16.3 g (0.1 mol) of 2-bromothiophene and 1.2 g (1 mole % of 2-bromothiophene) of catalyst Pd(PPh$_3$)$_4$, and stirred at 40° C. for 48 hours. The solution is then hydrolyzed in acidic aqueous solution containing hydrochloric acid, and extracted with diethylether. After drying and evaporation of the solvent, the row product is chromathographed over silica gel with pentane:dichloromethane 95:05 as eluent, giving first unreacted ferrocene (3%), then (2-thienyl)ferrocene (21%) and finally 1,1'-bis(2-thienyl)ferrocene (76%) (13.3 g of (IIIa) isolated). The following physical characteristics have been determined for (IIIa). Melting point: 154° C. Elemental microanalysis % exp (calc): C 61.68 (61.71): H 4.05 (4.00); S 18.17 (18.29); Fe 15.95 (16.00). IR (CCl$_4$), cm-1 : 998, 1030, 1045, 1064, 1165, 1190, 1235, 1260, 1288, 1391, 1415, 1465. NMR 13C (CDCl$_3$) C(ferrocene) 68.68, 71.01, 82.87; C(thiophene) 121.91, 123.09, 127.05, 141.68. NMR 1H H(ferrocene) 4.14(2H), 4.38(2H), H(thiophene) 6.81(2H), 7.02(1H). Mass spectrum analysis, M+ =350.

Synthesis of poly(ferrocenyl terthienylene)

Under argon atmosphere, 0.035 mole of n-butyllithium and 5.25 g (0.015 mol) of 1,1'-bis(2-thienyl)ferrocene, 5.2 ml (0.035 mol) of tetramethylene diamine catalyst and 100 ml of hexane solvent were mixed and reacted at 60° C. for 2 hours.

The reaction mixture is then added at room temperature to a solution of zinc chloride (0.035 mole, 4.75 g) in 20 ml tetrahydrofuran, and reacted under stirring during 2 hours at room temperature. The obtained organozinc derivative solution is then added to a solution of 2,5-dibromothiophene (0.015 mole, 3.63 g) and the catalyst Pd(PPh$_3$)$_4$ (2% in mole of 2,5-dibromothiophene, 0.21 g) in 20 ml tetrahydrofuran. The mixture is then heated during 48 hours at 45° C. After hydrolysis in aqueous acidic medium containing hydrochloric acid, the precipitated polymer is isolated by filtration, giving a red powder (3.3 g), corresponding to a yield of 51% in poly(ferrocenyl terthienylene).

This polymer has been characterized as following: Melting point: decomposition, without melting, at about 200° C. Elemental microanalysis (C22H14S3Fe) % exper. (calc): C 54.45 (61.40); H 2.87 (3.28); S 19.87 (22.34): Fe 12.83 (12.98). IR (KBr pellets) cm$^{-1}$: 973, 1027, 1046, 1071, 1227, 1254, 1386, 1426. NMR 13C (solid) C(ferrocene) 68.11, 70.51, 81.63; C(thiophene) 123.32, 126.60, 130,23. GPC has given an average Molecular mass of M$_w$=3107, and M$_n$=1168, with a dispersity index of M$_w$/M$_n$= 2.7, and an average value for n=4. UV-visible absorption spectrum (KBr pellets) gives two maxima, centered at 380 and 540 nm. The electrochemical characteristics have been determined by cyclic voltammetry in propylene carbonate 0.1M LiClO$_4$. An oxidation peak is observed at 0.5 V/SCE, with a shoulder at 0.25 V/SCE. This oxidation is reversible, which shows that this conjugated polymer can be reversibly oxidized to a doped state and further reduced. The doped state corresponds to a black powder, absorbing in the far red and near infrared spectrum. This state can also be obtained through chemical doping, by the use of an oxidant such as iron trichloride, FeCl$_3$, or a nitronium derivative such as NO$_2$PF$_6$ or NO$_2$BF$_4$. The doped state shows some conducting properties, determined by the four point probe method, leading to a value of 0.001 S.cm$^{-1}$.

Magnetic Properties of Poly(ferrocenyl Terthienylene)

Magnetic properties at room temperature have been experimentally confirmed for the doped state of this poly(ferrocenyl terthienylene). Starting from the undoped polymer, the action of an oxidant such as nitronium tetrafluoroborate, NO$_2$BF$_4$, in solution in dichloromethane, leads to the doping of the polymer. This doping process is evidenced by the change of color of the polymer, which passes from red to a dark black aspect. When submitted in presence of a magnet, such as a magnetic stirring bar coated with teflon, the doped poly(ferrocenyl terthienylene) is attracted vigorously to the magnet. It must be pointed out that this polymer is its undoped state does not present at all such magnetic property.

EXAMPLE 2

Synthesis of Poly(Ferrocenyl Bithienylene)

Under argon atmosphere, 0.035 ml of n-butyllithium, 5.25 g (0.015 mol) of dithienyl ferrocene, 5.25 g (0.035 mol) of tetramethylenediamine catalyst and 100 ml of hexane solvent were mixed and reacted at 60° C. for 2 hours.

The reaction mixture obtained was then cooled to −10° C., and added to a solution of copper chloride (0.035 mole, 4.7 g) in 50 ml tetrahydrofuran. This mixture is then stirred during 5 hours at low temperature, and further heated to 45° C. during 3 hours. The reaction medium is then hydrolyzed in acidic aqueous medium containing hydrochloric acid, and the precipitated polymer is extracted by filtration. Poly(ferrocenyl bithienylene) is thus obtained with a yield of 41% (2.1 g).

This poly(ferrocenyl bithienylene) has been characterized as follows: Melting point: unfusible up to 350° C. (decomposes). Microelemental analysis (C18H12S2Fe) % exper (calc): C 59.97 (62.08), H 3.50 (3.47), S 17.15 (18.41), Fe 15.91 (16.04). IR (KBr pellets) cm$^{-1}$: 976, 1027, 1046, 1068, 1222, 1249, 1376, 1424, 1459. NMR 13C (solid) C(ferrocene) 85.72, 68.98;C(thienyl) 124.61, 135.77. GPC gave an average molecular mass M$_n$=1141, and M$_w$=3040, leading to a mean value for n=3.

We claim:

1. An organo-ferromagnetic material obtained by oxidizing a polymer represented by the formula (III):

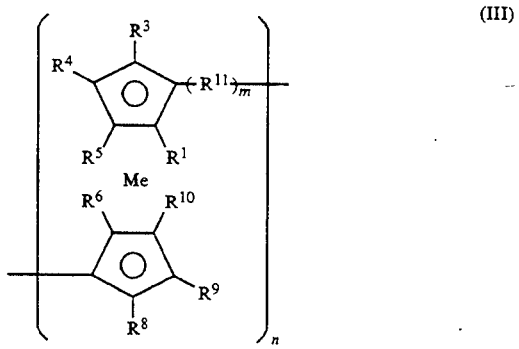

(III)

wherein R$^1$, R$^3$, R$^4$, R$^5$, R$^6$, R$^8$, R$^9$ and R$^{10}$ are a hydrogen atom, halogen atom, hydrocarbon having from 1 to 10 carbon atoms, amino, cyano, nitro, carboxyl or hydroxyl, R$^1$, R$^3$, R$^5$, R$^6$, R$^8$, R$^9$ and R$^{10}$ may be the same or different, R$^{11}$ is selected from the group consisting of a vinylene, phenylene, thienylene, pyrrolylene, furylene, selenophenylene, telluruphenylene, anililene, quinolylene and a conjugately combined group thereof, Me is a transition element of the Group IV to Group VIII in the Periodic table, m is an integer of 3 to 1000, and n is an integer of 2 to 100000.

2. A polymer represented by the formula (IV):

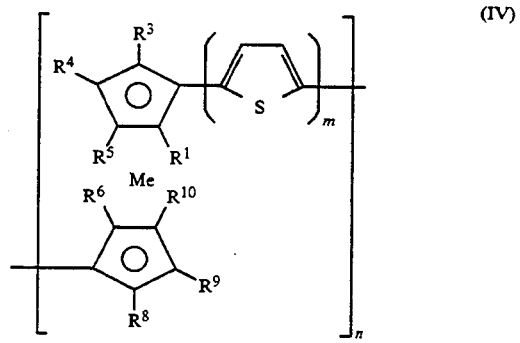

wherein $R^1$, $R^3$, $R^4$, $R^5$, $R^6$, $R^8$, $R^9$ and $R^{10}$ are a hydrogen atom, halogen atom, hydrocarbon having from 1 to 10 carbon atoms, amino, cyano, nitro, carboxyl or hydroxyl, $R^1$, $R^3$, $R^4$, $R^5$, $R^6$, $R^8$, $R^9$ and $R^{10}$ may be the same or different, m is an integer of 3 to 1000 and n is an integer of 2 to 100000.

3. The organo-ferromagnetic material of claim 1, wherein said transition element Me is titanium, zirconium, chromium, nickel, vanadium, osmium, ruthenium, cobalt or iron.

* * * * *